Figure 1:
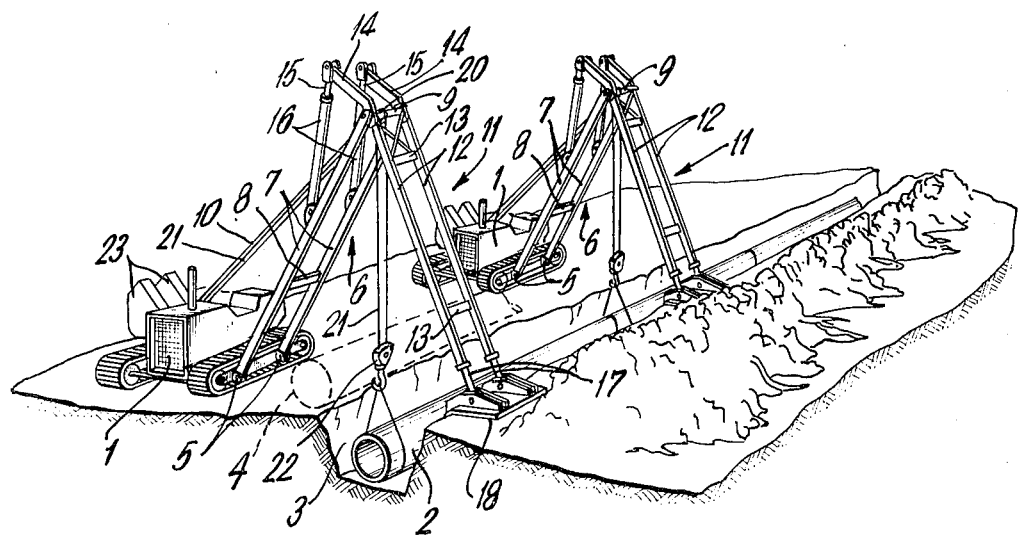

United States Patent [19]

Scodino

[11] 4,020,952
[45] May 3, 1977

[54] ARTICULATED STAND APPARATUS FOR LAYING AND RECOVERING PIPELINE

[75] Inventor: Amborgio Scodino, San Donato Milanese, Italy

[73] Assignee: Saipem S.p.A., Milan, Italy

[22] Filed: Mar. 27, 1975

[21] Appl. No.: 562,799

[30] Foreign Application Priority Data

Mar. 28, 1974 Italy .................. 49833/74

[52] U.S. Cl. .................. 214/1 PA; 61/105; 212/145; 214/95 A; 214/394; 214/658
[51] Int. Cl.² .................. B66C 23/42
[58] Field of Search .............. 214/1 PA, 658, 394, 214/95 A; 212/56, 63, 145; 61/72.5, 72.7, 105

[56] References Cited

UNITED STATES PATENTS

| | | | |
|---|---|---|---|
| 1,341,042 | 5/1920 | Boyrie | 212/145 X |
| 1,341,176 | 5/1920 | Jones | 212/145 X |
| 1,985,285 | 12/1934 | Erdahl | 212/145 |

FOREIGN PATENTS OR APPLICATIONS

| | | | |
|---|---|---|---|
| 1,531,139 | 9/1967 | Germany | 212/145 |

*Primary Examiner*—Robert J. Spar
*Assistant Examiner*—George F. Abraham
*Attorney, Agent, or Firm*—Ralph M. Watson

[57] ABSTRACT

An articulated stand apparatus for laying or recovering pipeline in or from a trench dug in the ground wherein the apparatus is hinged to the side of a tracked means or side boom and includes lifting tackle with a hook.

The apparatus includes two rigid frames. One frame is hinged at its lower end to the tracked means in such a way that it can be rotated in a plane transverse to the tracked means. The second frame has extensible telescopic elements at its lower end for resting on the ground. The upper ends of the frames are hinged to each other and are disposed in a reversed V with the lifting tackle and hook supported at the vertex of the frames.

Extending from the upper end of the second frame is a pair of arms whose ends are hinged to pistons of hydraulic cylinders, which, in turn, are hinged to the center line of the first frame. In operation, the second frame can be hydraulically rotated about its hinged connection to the first frame so that the second frame can move over a trench and lay its extensible elements on the ground of the trench opposite to the tracked means.

In a preferred embodiment, the telescopic elements extending from the lower end of the second frame are connected to a motorized tracked carriage.

2 Claims, 2 Drawing Figures

U.S. Patent   May 3, 1977   4,020,952

ARTICULATED STAND APPARATUS FOR LAYING AND RECOVERING PIPELINE

The present invention relates to an improved articulated stand apparatus which allows a swifter, safer and consequently more inexpensive way for laying pipeline into or recovering pipeline from a trench dug in irregular or friable ground. The apparatus presents such a static stability to annul whatever moment tending to turn over the hoisting equipment used in the laying or recovery operations and reduces considerably the load acting on said hoisting equipment.

As known, pipelines are generally laid underground for protection and safety's sake into trenchs dug in the ground along the laying line of said pipelines. It is hence necessary to lift the pipeline lying on the ground near the slope of the dug trench, to shift said pipeline above the vertical line of the trench and then to lay it on the bottom of the trench. On the other hand defects in weldings, an insufficient cathodic protection or other accidents can sometimes require recovery of pipeline already laid underground so as to let said pipeline come out the trench in a position easily obviating its drawbacks.

Now, the above said displacements to the pipeline to effect the laying and recovery operations are generally made by means of a certain number of crawlers, known also as "sideboom" which are aligned along the prepared trench.

Every crawler is provided with a crane apparatus comprising a framework or arm hinged at its lower part to a side of the crawler in such a way to rotate in a transversal plane to said crawler, said arm being kept in the desired position by cable fixed to other free end of the arm and wound around the drum of a winch of the crawler.

At its free upper end said arm supports a pulley system suitable for a certain number of cable which connect to the drum of another winch of the crawler tackle provided with a hook suitable for the vertical shifting of the pipeline.

In such a way the lateral arm of the crawlers, owing to its rotation around the hinges of the sideboom side and to the contemporaneous lifting and lowering of the tackle provided with a hook, provide movement suitable for shifting the pipeline from the ground on which it is located to the trench bottom or vice versa.

Said crane apparatus, which is already known by the prior art for the laying or recovery operations of a pipeline, present nevertheless in practice, working and economic drawbacks.

Above all, since the pipeline weight is supported on a side of the sideboom at the end of an arm, there is a moment tending to turn over the sideboom. This drawback is obviated by furnishing the sideboom with a counter weight placed at the side opposite to the one where the lifting of the pipeline occurs, said counter weight being such to equilibrate the maximum moment which is obtained when the pipeline is wholly displaced on the vertical axis of the trench.

This combination does not wholly eliminate however the danger of overturning the sideboom due to an incorrect maneuver, especially when the ground is irregular. In this case, in order to avoid the sideboom overturning which, besides causing incidents for the men which are working along the trench, may also cause the unbalancing and overturning of the other sidebooms, the lifting and shifting maneuvers for the pipeline have to be made with utmost caution and ability and therefore with a remarkable loss of time, which is prejudicial to the economy and safety of the operation. On the other hand the use of a heavy counterweight due to the fact the greatest moment to be balanced causes the tracks of the sideboom to act with a remarkable pressure on the ground so that when the ground is friable or less firm, there is the possibility of landslide of the trench slope collateral to the sideboom track supporting the maximum load which arises when the pipeline is laterally displaced on the vertical axis of the trench, and which causes consequent loss of time due to the required work for the readjustment of the damaged trench.

An object of the present invention is to eliminate the above said drawbacks and hence to provide a crawler or sideboom suitable for use in laying pipeline into or recovering pipeline from a trench dug in the ground, said sideboom allowing work in a swift, safer and consequently inexpensive way on whatever type of ground.

This is practically obtained by providing the sideboom with an articulated stand apparatus which is hinged at one of its ends to the side of the sideboom, passes over the laying trench assuming the shape of a reversed V and leans its other end provided with a support member on the ground adjacent to the trench slope opposed to side where there is the sideboom, the tackle for lifting the pipeline to be laid or recovered being supported at the vertex of said articulated stand apparatus. In this way, since the counterweight of the sideboom may be made light, given the fact that now its function is limited to only balancing the moment due to only the articulated stand uncharged by the weight of the pipeline, during its rotatory motion for passing over the laying trench and since all the load is supported partly by the tracks of the sideboom and partly by the support member, there is the obtainement of a remarkable lessening of the load which has to be supported by the ground on which the tracks of the sideboom lean and consequently the ground may resist in a better way and support said load without dangerous landslides. Furthermore, the moments which occurred during the laying or recovery operations are obviated since the pipeline is not supported by cantilevered the free end of an arm, but by the central articulated joint of a laid stand.

In this way the danger of an overturning of the used sideboom is eliminated so that the latter may act on whatever type of ground. On the other hand there is now to keep in mind that the side displacement operation of the pipeline on the vertical axis of the laying trench is not made by means of a rotation of an arm hinged to the side of the sideboom, but by means of a telescopic sliding of extensible elements of the articulated stand part which leans on the ground adjacent the trench at the side opposite to the one where the sideboom works, so that during this operation there are not overturning moments and therefore all the displacements of the pipeline may be made by the workmen with an absolute safety and celerity.

Summing up, according to one embodiment of the present invention the sidebooms used in the laying or recovery operations are provided each with an articulated stand apparatus comprising a first rigid frame constituted by two parallel arms connected to each other and hinged at their lower ends to a side of the sideboom in such a way that they may rotate in a transverse plane as to the said sideboom by means of a positioning cable which is fixed to the upper part of said first frame, winds itself around the drum of a winch of the sideboom the other and upper end of the first rigid frame is connected to a second rigid frame constituted by hollow cylindrical parallel arms including telescopically extensible elements which to lean on the ground. The two rigid frame are disposed according to a reversed V and supporting at their articulation, i.e. the vertex of the above said reversed V a lifting tackle provided with a hook. According to another embodiment of the invention the two hollow cylindrical arms of the said second rigid frame have two bracket bars whose ends are hinged to pistons of two hydraulic cylinders hinged at their turn on the center line of the arms of the first rigid frame. Said second rigid frame may thus be hydraulically rotated around to the hinges connecting it to the first rigid frame so that said second frame may open more or less in the form of a compass for overpassing the trench and laying its extensible elements on the ground of the trench opposed to side where the crawler track works.

According to a further embodiment of the invention the said extensible elements of the second rigid frame are constituted by two hydraulically displaceable pistons, which are made telescopically to slide inside the said hollow cylindrical arms of the second rigid frame and at the free ends of which there is articulated a bearing plate whose bearing surface presents incisions able to exert pressure between the ground and the said surface.

According to a different way of realization of the invention, to the free ends of the extensible elements of the second rigid frame there is articulated, instead of a bearing plate, a motorized tracked carriage. In this last realization the sidebooms provided with articulated stand can be moved along the trench during the laying operation which may be effectued contemporaneously to another operation, e.g. a binding operation of the pipeline, so that a remarkable saving of time is obtained in the construction of the pipeline.

The invention is now better shown with reference to the accompanying DRAWINGS illustrating a preferred embodiment given only as an example, since technical and constructive variants may practically be effectued within the limits of the present invention.

Figure 2:
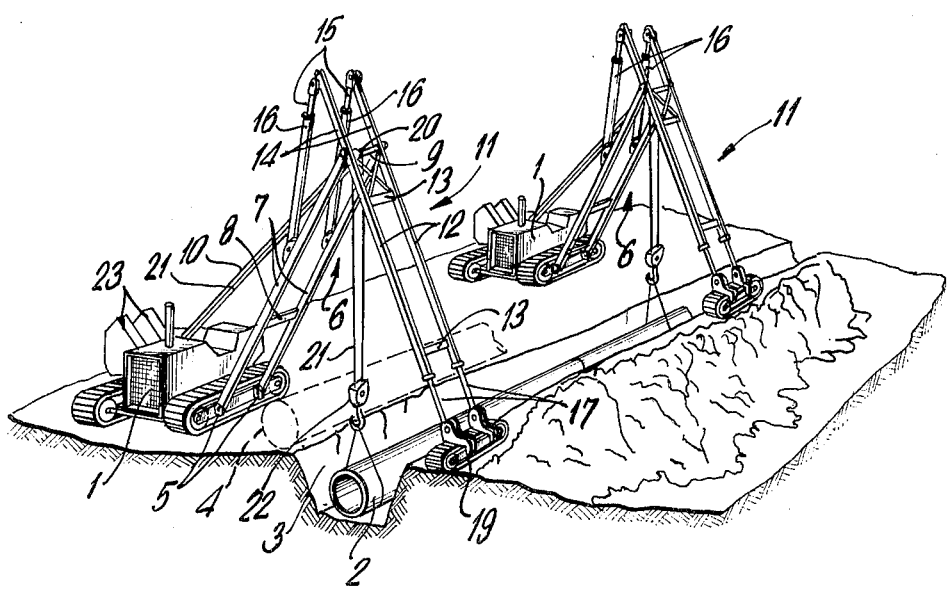

In said drawings:

FIG. 1 shows in a perspective view the set of two sidebooms used in the laying or recovery operation of a pipeline into or from a trench dug in the ground, each of said sidebooms being provided with an articulated stand apparatus comprising a bearing plate, according to the invention, FIG. 2 is a perspective view like to the one of FIG. 1, wherein the bearing on the ground of the articulated stand apparatus of the sidebooms is made by means of a motorized tracked carriage.

With reference to the figures, numeral 1 indicates the crawlers or sidebooms which, being aligned along a trench 3, dug in the ground, have the function to lay a pipeline 2 inside said trench drawing it from a position 4 (dashed in the Figures) from one side of a slope of the trench. On one side of each sideboom are jointed, by means of two hinges 5, the lower ends of a first rigid frame 6, constituted by two parallel arms 7 connected by two stiffening arms 8 and 9, this last arm 9 is positioned in correspondence of the upper ends of the above said arms.

The hinging of said first rigid frame 6 on the side of the sideboom is made in such a way to allow said rigid frame a rotation displacement in a plane perpendicular to the sideboom, adjusted by a positioning cable 10 which, fixed to arm 9, winds oneself up on the drum of a capstan positioned on the sideboom and not shown in the figures.

To the upper end of the first rigid frame 6 is hinged a second rigid frame 11 constituted by two hollow parallel frames 12, connected by stiffenning frame 13. Said hollow frames 12, which form with the frames 7 of the first rigid frame of the reversed V, extend in their upper part and are hinged to the first rigid frame by two arms 14 to which at their extremity are hinged the pistons 15 of the two hydraulic cylinder 16, the extremity of which are hinged, at their turn, on the center-line of the frames 7 of the first rigid frame 6.

A hydraulic system not shown in the figures is provided for driving the said cylinders 16 which serve to rotate said second rigid frame 11 around its hinge connection to the first rigid frame 6 in order to allow it to move over the trench 3.

Inside the hollow cylindrical arms 12 of the second rigid frame 11 there are two extensible elements or pistons 17 which, driven by another hydraulic system not shown in the FIGURES, can be made to telescopically slide in one direction or in an opposite direction inside said arms to lay on the ground of the trench 3 opposite to the side in which the sidebooms 1 works. Said bearing on the ground is made by a support plate 18 articulated to the free extremities of the pistons 17 which come out from frames 12. The support plate 18 presents a contact surface on the ground having incisions able to make a strong aderence between the ground and said surface.

According to a variant of the invention the second rigid frame 11 rests on the ground, by means of a motorized tracked carriage 19 (see FIG. 2) instead of by means of support plate 18. Carriage 19 also is articulated to the free extremity of the pistons 17. Said motorized carriage which is driven in synchronism with the engine of the correspondent sideboom by mechanical means not shown in the figures allows the sidebooms to move longitudinally to the line of the trench 3, during the laying operation which can be effected contemporaneously to another operation e.g. the operation of the binding of the pipeline 2.

Finally the two rigid frames 6 and 11 constitute an articulated stand having the shape of reversed V which is positioned over the lay trench 3, the lifting device of the pipeline being supported at the vertex of said stand.

More precisely, to the vertex of the reversed V formed by two said rigid frames and supported by said arm 9, there are two pulleys 20 for sending back a lifting cable 21 connecting a lifting tackle 22 provided by a hook with the drum of another capston situated on the sideboom and not shown in the figures.

Finally, since the articulated stand is cantilevered during the rotation movement in the step of moving over the lay trench 3 which bears on the sideboom and cause a moment, there are counterbalancing counter weights 23 positioned on the side of the sideboom opposite to the side to which is hinged the articulated stand.

However said counter weights, only have to counterbalance the weight of the articulated stand and not the pipeline. They are now relatively light and the sideboom is not burdened.

The laying operation with articulated stand apparatus of the present invention is made in the following way.

By acting on the positioning cables 10 and on hydraulic cylinders 16, the two rigid frame 6 and 11 of the articulated stand of the sideboom 1 like a compass open in order that the lifting tackle 22 find itself on the vertical of the position 4 in which is layed the pipeline for laying underground and that the second rigid frame 11 is oriented in the direction of the ground on the opposite side of the trench to the side where work the sidebooms. Then the pistons 17 are let out so that the support plates 19 can be laid on said ground. In this way the articulated stand of the sideboom is stable astride the trench 3 and the cables 10 are loosened. The pipeline is after slinged to the hooks of the tackle 22 and having lifted it by means of cable 21 move the pipeline on the vertical of the trench 3.

Now, by lowering the tackle 22, the pipeline is laid inside said trench. The recovery operation is made in similar way. From what above mentioned results immediately evident that, with the articulated stand apparatus of the present invention the laying or recovery operations of a pipeline can be made with absolute precision and safety within a short time and practically on all types of ground.

What we claim is:

1. An improved articulated stand apparatus for laying or recovering a pipeline in or from a trench dug in the ground, said apparatus being hinged on the side of a tracked means or sideboom and having a lifting tackle provided with a hook, comprising:

a first rigid frame having two parallel arms hinged at their lower ends to a side of the tracked means in such a way that said frame can be rotated in a plane transversal to the tracked means by a positioning cable fixed to the upper part of said first frame and winding around to a drum of a capstan of the tracked means, a second rigid frame having parallel hollow tubular arms with extensible telescopic elements on their lower ends for resting on the ground and with their upper ends hinged to said first rigid frame, said two rigid frames being disposed according to a reversed V with the lifting tackle provided with the hook supported by the said frames in the vertex of said reversed V, two cantilevered arms extending from the upper parts of said parallel hollow tubular arms of said second rigid frame and two hydraulic cylinders having their lower ends hinged to the center line of said arms of said first rigid frame and including at their upper ends pistons hinged at their upper ends to said cantilevered arms for hydraulically rotating said second rigid frame about said first rigid frame for moving said second rigid frame over a trench and laying its extensible elements on the ground of the trench opposite the tracked means.

2. The improved apparatus of claim 1, wherein a motorized tracked carriage is connected to the lower ends of said telescopic elements of said second rigid frame.

* * * * *